United States Patent Office 3,182,758
Patented May 11, 1965

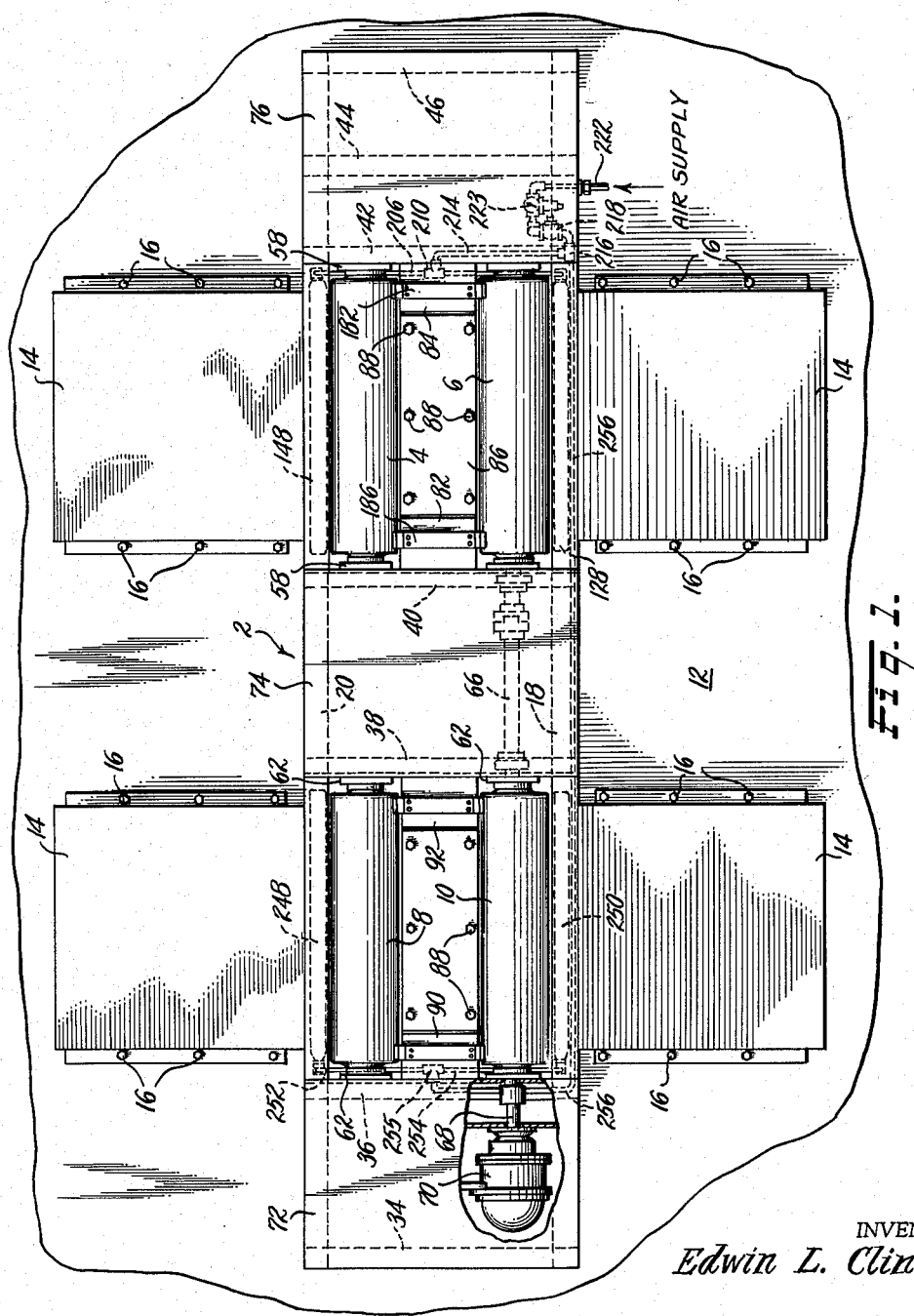

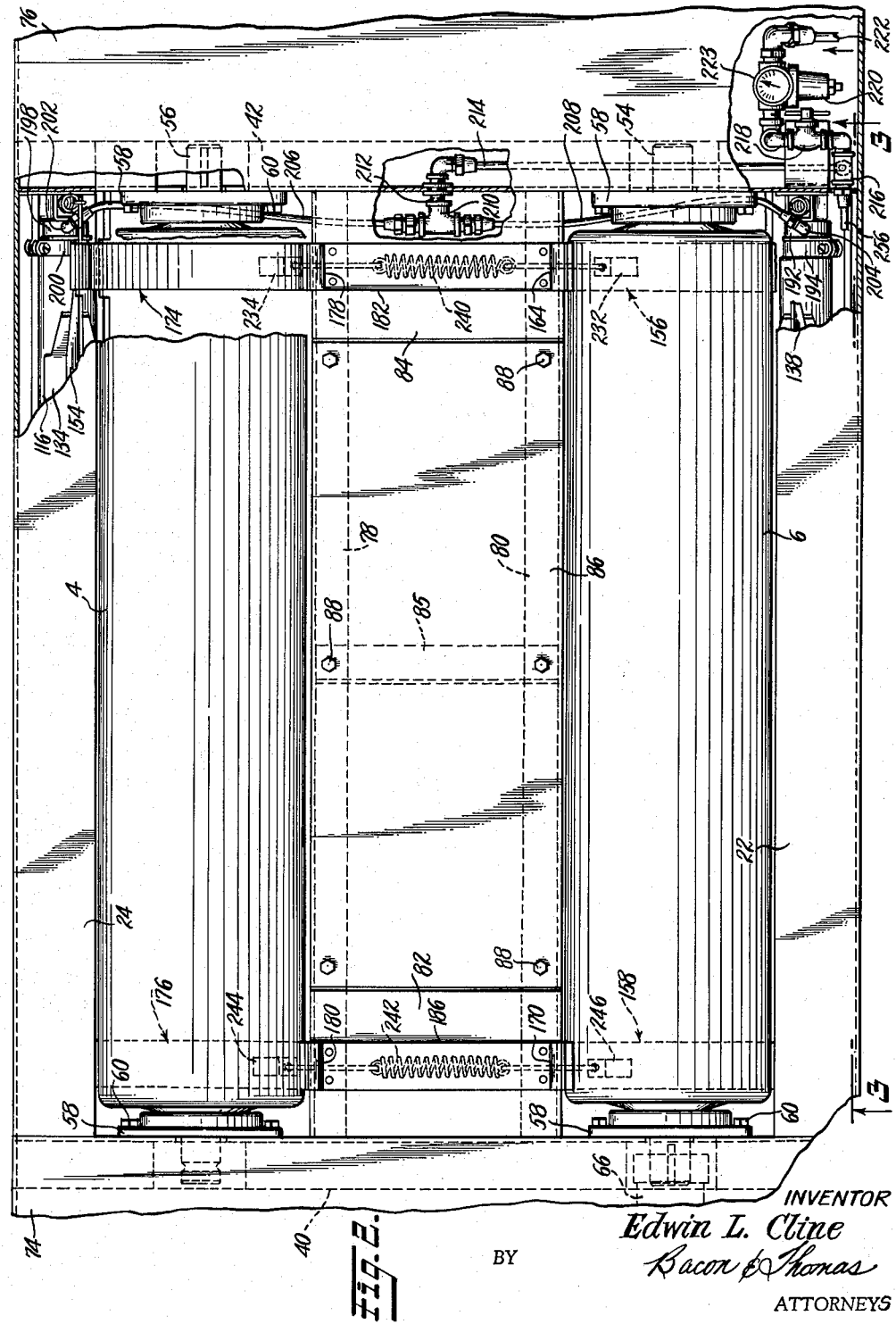

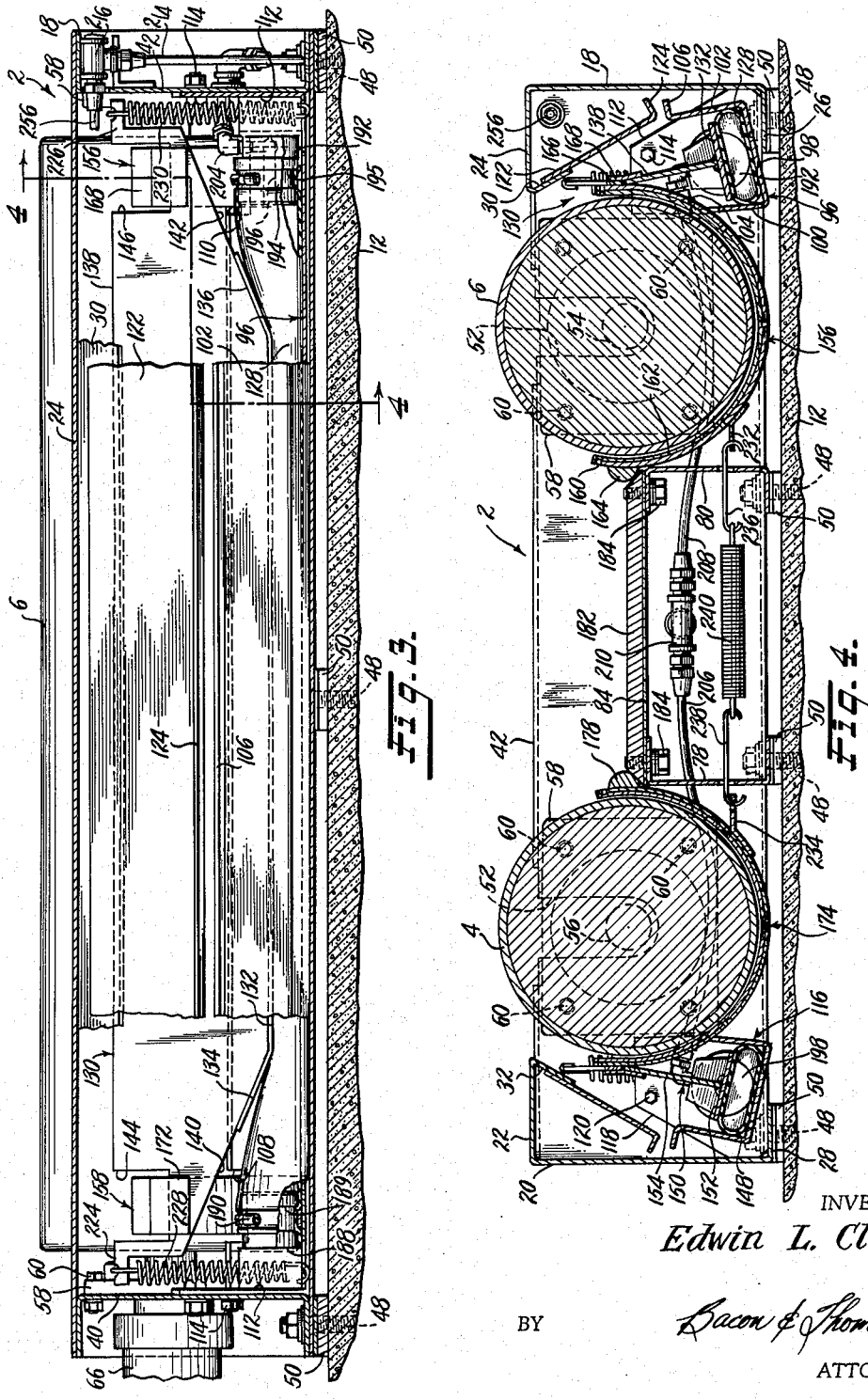

3,182,758
BRAKE FOR CHASSIS DYNAMOMETERS
Edwin L. Cline, Pasadena, Calif., assignor to Clayton Manufacturing Company, El Monte, Calif., a corporation of California
Filed Oct. 8, 1962, Ser. No. 229,110
21 Claims. (Cl. 188—77)

This invention relates generally to motor vehicle chassis dynamometers of the type employing spaced cylindrical rolls for transmitting power from the drive wheels of a vehicle to a power absorption unit, and more particularly to a new and improved brake device for holding the rolls against rotation, whereby to facilitate removal of the vehicle therefrom.

Chassis dynamometers are commonly employed to analyze the performance of motor vehicle engines, to detect malfunctions or defects in other parts of a motor vehicle, and for like purposes. Generally, dynamometers of the type to which this invention relates comprise a flat bed or frame having mounted horizontally thereon one or more pairs of cylindrical rolls arranged in parallel, spaced relationship, and positioned to engage and to be driven by the drive wheels of a motor vehicle cradle thereon. In some instances, only two long rolls are utilized, the rolls having a length sufficient to permit both of the rear drive wheels of a motor vehicle to engage the same. The dynamometer with respect to which the present invention is illustrated and described is not of this type, but instead utilizes two aligned, spaced pairs of cylindrical rolls, one pair for each of the drive wheels at the opposite sides of the vehicle. While the subject invention is described with relationship to the latter type of roll arrangement, it is to be understood that it can also be utilized with dynamometers having but one pair of rolls, and with other similar roll-employing devices.

The aligned rollers of the two pairs of rolls of the chassis dynamometer disclosed herein are coupled together, and two of the coupled rolls are connected to a hydraulic dynamometer, or power absorption unit, whereby to transmit power from the drive wheels to said unit. Normally, little difficulty is encountered in driving a motor vehicle onto the bed of the apparatus so that the drive wheels thereof are cradled between their respective sets of rolls. However, because the rolls are mounted in bearings and rotate with the drive wheels, it is necessary to hold the rolls of each pair against rotation to permit the vehicle to be driven off forwardly or back off the rolls. It is to an improved brake apparatus for so holding the cylindrical rolls that this invention is directed.

The roll brake of the present invention includes a pair of semi-cylindrical brake bands or shoes, each restrained but loosely supported at one end thereof to extend beneath and more than half-way around one of the dynamometer rolls. A channel-shaped member is disposed to one side of and parallel to said roll, and opens upwardly at a substantially tangential angle to the roll toward the unsupported end of said brake bands. A tubular inflatable diaphragm lies in said channel member, and the head of an inverted, generally T-shaped actuator plate rests upon said diaphragm. The stem of the T-shaped actuator extends upwardly to and engages the other ends of the brake bands. Thus, the diaphragm is inflated, the actuator moves upwardly, carrying the two brake band ends connected therewith in the same direction and thus forcing the bands into tight engagement about the lower portion of the roll.

The brake bands and the actuator plate or element are connected with springs arranged to urge them toward their initial, non-braking positions. Thus, when the pressure within the tubular diaphragm is relieved, the springs urge the actuator plate downwardly collapsing the diaphragm and disengaging the brake bands from the roll, whereby said roll is free to rotate.

The roll brake of the present invention utilizes a minimum of elements, and hence is economical to manufacture and relatively easy to install. The brake shoes are substantially free floating and are actuated by the tubular air-operated diaphragm, so arranged that a high braking force is exerted on the roll associated therewith through two brake shoes. Moreover, the diaphragm is so constructed that the brake bands seldom, if ever, require servicing or adjustment during the life of the brake lining. A separate diaphragm is provided for each roll, and all diaphragms are interconnected by air lines so that they are simultaneously actuated to apply braking force to all four rolls. Thus, the new roll brake has advantages over prior brakes, both in its initial installation and in service.

The principal object of this invention is to provide a brake for holding a cylindrical roll against rotation, and which is so constructed as to be relatively easy to install and wherein the brake shoes require substantially no servicing or adjustment during their normal life expectancy.

Another object is to provide a remotely controlled brake apparatus that is actuatable to simultaneously hold all rolls of a chassis dynamometer against rotation.

A further object is to provide a brake apparatus which utilizes a minimum of components and which is economical to manufacture.

It is also an object to provide an inflatable diaphragm actuator for a roll brake designed to apply a highly effective braking force to the roll through a pair of brake shoes and to compensate for uneven lining wear and minor maladjustments.

Another object is to provide a chassis dynamometer roll brake that is compatible with and adapted to be installed on existing dynamometer equipment, as well as original equipment on a new dynamometer.

A still further object is to provide a novel retracting arrangement for automatically releasing the brake bands from the roll upon deflation of the actuating diaphragm.

Other objects and advantages of the invention will become apparent from the following detailed description when considered in connection with the accompanying drawings, wherein:

FIG. 1 is a plan view of a chassis dynamometer showing in particular the two pairs of rolls with the brake mechanism of the present invention associated therewith;

FIG. 2 is an enlarged plan view of the right-hand pair of rolls of FIG. 1, with one of the rolls and portions of the frame and cover plate broken away to show structure in the interior thereof;

FIG. 3 is an enlarged longitudinal sectional view taken along the line 3—3 in FIG. 2, showing in front elevation the brake device of the present invention; and FIG. 4 is an enlarged detail sectional view taken along the line 4—4 of FIG. 3.

Referring now to the drawings, the frame of the chassis dynamometer is indicated generally at 2, and has mounted thereon a first pair of horizontal spaced, parallel cylindrical rolls 4 and 6, and a second like pair of rolls 8 and 10. The rolls 6 and 10 are drive rolls and the rolls 4 and 8 are idle rolls, as is well understood in the art. The frame 2 normally rests upon a suitable floor 12 (FIGS. 3 and 4), and hence projects a distance thereabove. To facilitate movement of wheeled vehicles thereover, inclined ramps 14 are provided on both sides of the the frame 2, said ramps being secured to the floor 12 by bolts 16.

The frame 2 comprises a pair of longitudinally disposed, confronting, generally U-shaped channel members 18 and 20, the upper legs 22 and 24, respectively, of each channel being longer than the lower legs 26 and 28 thereof and terminating in inwardly inclined lips 30 and 32, respectively. The longitudinal members 18 and 20 are interconnected by transversely extending channel members 34, 36, 38, 40, 42, 44 and 46, all of which are welded or otherwise rigidly secured together. The cross members 36–38, and 40–42 face in opposite directions, and bolts 48 (FIGS. 3 and 4) pass through the legs 26 and 28 and the bottom legs of the chanel members 34 to 46 to secure the frame to the supporting floor 12; shims 50 of suitable thickness may be inserted between the frame 2 and the floor for the purpose of leveling the frame.

Each of the cross members 40 and 42 has U-shaped recesses 52 therein (FIG. 4) for receiving the supporting stub shafts 54 and 56 of the rolls 4 and 6, suitable bearings 58 being secured in position by bolts 60 to said cross members to mount said shafts for free rotation. The cross members 36 and 38 have similar recesses therein, and bearing units 62 are secured in position about said recesses for supporting the opposite ends of the supporting shafts for the rolls 8 and 10.

A shaft 66 connects the stub shafts of the rolls 6 and 10; thus, rolls 6 and 10 will rotate together. The stub shaft of the roll 10, and hence its connected roll 6, is connected by a shaft 68 to a hydraulic power absorption unit 70 which is supported by said shaft, itself. The unit 70 is of the type shown in Patent 2,768,711, and hence will not be described in detail; briefly, its function is to absorb power transmitted to the drive rolls 6 and 10 by the drive wheels of a vehicle cradled thereon.

Cover plates 72, 74, and 76 are suitably secured to the frame channel members, and function to enclose and protect the unit 70, shafts 64 and 66, and other equipment contained within said frame. For purposes of clarity, the cover plates 74 and 76 are not shown in FIGS. 3 and 4.

Referring now to FIGS. 1, 2 and 4, a pair of spaced, facing, U-shaped channel members 78 and 80 is disposed between the rolls 4 and 6, and extends between and is welded to the cross members 40 and 42. A pair of support plates 82 and 84 extends across the top surfaces of said channel members 78 and 80 at their opposite ends and are welded in position. A cross member 85 extends between said channels midway of their length. A cover plate 86, secured in place by bolts 88, rests on the facing channel members between the support plates and covers the space defined thereby. A similar pair of facing channels (not shown) is disposed between the rolls 8 and 10, and support plates 90 and 92, and a cover plate 94, are secured thereon.

The brake apparatus of the present invention will be described in detail only with respect to the pair of rolls 4 and 6, it being understood that the identical apparatus is employed with the other pair of rolls 8 and 10. Referring now to FIGS. 3 and 4, a generally U-shaped, upwardly facing channel member 96 is shown disposed in front of and parallel to the roll 6, said member having its bottom 98 disposed at an angle to the horizontal such that a perpendicular line from the middle of the bottom will extend nearly tangential to the surface of the roll 4. The rear leg 100 and the front leg 102 of said channel have forwardly directed lips 104 and 106, respectively, thereon, and the rear leg 100 has a pair of notches 108 and 110 (FIG. 3) near the opposite ends thereof. The opposite ends of the channel member 96 are welded to plates 112, which are secured to the cross members 40 and 42, respectively, by bolts 114 to thereby fix the member 96 in position.

A channel member 116, identical in construction to the channel member 96 and welded to end plates 118, is secured to the cross members 40 and 42 by bolts 120 in a position corresponding to that of the member 96. A plate 122 having a lip 124 on the lower end thereof facing in the same direction as, and generally parallel to, the lip 106 is secured, as by welding, to the portion 30 of channel member 18, and a similar plate 126 is secured to the portion 32 of channel member 20.

Within the channel member 96 is an inflatable tubular diaphragm 128, which will be described in greater detail hereinafter. Resting upon the diaphragm 128 is a generally T-shaped actuator 130. The head, or base plate of said T-shaped actuator 130, comprises a flat plate 132 bent upwardly at both of its ends 134 and 136. The stem of the T-shaped actuator 130 consists of a plate 138 cut away at its two lower corners 140 and 142 on an angle corresponding to that of the upwardly bent ends 134 and 136. The plate 138 is welded to the plate 132 medially thereof and extends perpendicularly therefrom. The plate 138 extends generally tangentially to the roll 6, but as is shown in FIG. 3, it is bent slightly away from said roll near the upper end thereof. The plate 138 also has a pair of rectangular notches 144 and 146 cut into the upper edge thereof near its opposite ends, said notches being disposed directly above the notches 108 and 110, respectively, in the channel member 96.

The channel member 116 has disposed therein a tubular diaphragm 148, which is identical to the diaphragm 128, and an actuator element 150, identical to the actuator 130, rests upon said diaphragm and includes a base plate 152 and a plate 154 perpendicular thereto. The diaphragms 128 and 148 may be made of rubber or any other suitable material.

Disposed to extend about the lower surface of the roll 6 and positioned near the opposite ends thereof is a pair of identical brake bands 156 and 158. The band 156 includes an outer, arcuate flexible metallic band 160 having a conventional brake lining 162 secured thereto by rivets. An arcuate, transversely-extending anchor 164 is secured, as by welding, to the rear end of the metallic band 160, and a hook is formed on the front end thereof by a narrow spacer 166 and a relatively wide plate 168 flared outwardly at its lower edge; the spacer 166 and the plate 168 are secured to the metallic band by any suitable means, such as rivets. The hook thus formed is receivable within the notch 146 in the plate 138.

The band 158 is identical to the band 156, and includes an anchor 170 on its rear end and a hook 172 on its front end, the latter being receivable within the notch 144 in plate 130. Similarly, the roll 4 has a pair of brake bands 174 and 176 extending thereabout at its opposite ends, said bands being identical to the bands 156 and 158 and having arcuate anchors 178 and 180, respectively, thereon. The brake bands 174 and 176 are both provided with hooks on the forward edge thereof, which hooks are engaged within the spaced notches in the plate 154.

As is best shown in FIG. 4, the channel members 78 and 80 are each spaced slightly from the rolls 4 and 6, to define a space therebetween. A narrow, relatively thick guide plate 182 is secured to the plate 84 by bolts 184, both ends thereof being chamfered or beveled to provide a camming surface. A similar guide plate 186 is secured to the plate 82, the guide plates 182 and 186 being in alignment with their respective brake bands 156–174 and 158–176. The metallic portion of each brake band extends through the space between the channel members 78 and 80 and the rolls 4 and 6, and the arcuate anchor on each said band rests on the beveled cam portion of its associated guide plate 182 or 186 to thereby support the rear free end thereof in position.

One end of the flexible tubular diaphragm is telescoped over a solid plug or end cap 188, said cap having an annular groove 189 therein and being secured in position by a band clamp 190 (FIG. 3). The opposite end of said diaphragm has a plug or end cap 192 secured therein by a band clamp 194, said end cap 192 also having an annular groove 195 thereon. An angle passage 196 extends through the end cap 192, and communicates with the interior of the diaphragm 128.

The diaphragm 148 is capped at both of its ends in the same manner as the diaphragm 128, a cap 198 in the right end thereof being secured in position by a clamp 200 and having an angle passage therein similar to the passage 196. The passage in the end caps 192 and 198 is fitted with elbows 202 and 204, respectively, and tubes 206 and 208, respectively, extend through bores in the channels 78 and 80 and connect said elbows to the ends of a T-fitting 210.

The stem of the T-fitting 210 is connected to one end of a nipple 212, which extends through and is secured in a bore in the web of the cross channel 42. The other end of the nipple 212 is connected by a conduit 214 to the stem of a distribution T-fitting 216, one end of which is connected through a control valve 218 and a pressure regulator 220 to an incoming conduit 222 carrying pressurized air. A pressure gage 223 is connected with the valve 220 to indicate the pressure of the air available to inflate the diaphragms 128 and 148. Thus, by opening the control valve 218, pressurized air may be simultaneously admitted to both of the diaphragms 128 and 148, thereby inflating the same and moving the actuators 130 and 154 upwardly.

As the actuators 130 and 150 are urged upwardly by their respective expanding tubular diaphragms, the forward ends of the brake bands, which are hooked over the plates 138 and 154 are carried upwardly therewith. Because the brake bands are anchored at their rear ends, upward movement of the forward ends thereof will quickly wrap them tightly about their respective rolls; the arcuate anchors on the brake bands cooperating with the beveled cam ends on the anchor strips 182 and 186 to facilitate movement of the brake bands toward and into tight engagement with their respective rolls.

When it is desired to release the brake bands from the rolls, the air is released from the two diaphragms through the control valve 218, allowing them to collapse. The actuators 130 and 150 are then free to retract, and the brake bands are thereafter no longer tightly held around their rolls.

In order to insure rapid collapse of the diaphragms 128 and 148 after the pressurized air is released therefrom, means is provided to positively urge the actuators 130 and 150 downwardly to facilitate collapsing of said diaphragms.

Referring in particular to FIG. 3, the plate 138 of the actuator 130 is provided with protruding ears 224 and 226 at the opposite ends of the top edge thereof. One end of a coiled spring 228 and 230 is hooked over the ears 224 and 226, respectively, and the lower ends of said springs pass through openings in the bottom wall of the channel 96 and are hooked thereto under tension. The other actuator plate 150 is furnished in like manner with coil springs, and accordingly, when the pressurized air is released from the diaphragms, said springs move their respective actuators downwardly to release the brake bands and to collapse said diaphragms.

When the actuators 130 and 150 retract, the brake bands are no longer held against the rolls. However, they may remain in such close proximity thereto, unless forcefully released, that the linings thereof will be slightly in contact with their associated rolls. If this should occur, any relative motion between the rolls and said linings will wear the latter, and hasten the necessity for replacement thereof. The present invention provides means for forcefully withdrawing the brake bands from the rolls, and hence eliminates this possible source of lining wear.

Referring again to FIG. 4, the confronting surfaces of the metallic bands of the two aligned brake bands 156 and 174 have brackets 232 and 234, respectively welded thereto at a point near the bottom thereof. These brackets each have holes for receiving one end of a connecting link 236 and 238, which links pass through openings in the channels 78 and 80 and are hooked to the opposite ends of a tension spring 240. Thus, the spring 240 functions to completely retract the brake bands 156 and 174 from the rolls after the actuators have moved downwardly sufficiently to release pressure on the hooked brake band ends.

The brake bands 158 and 176 are provided with a retracting spring 242, identical to the spring 240, said spring 242 being secured to brackets 244 and 246, respectively, on said bands.

As has been stated hereinabove, the rolls 8 and 10 are provided with brake means identical to that utilized for the rolls 4 and 6, the brake for the roll 8 being activated by a tubular diaphragm 248 and that for the roll 10 being activated by a similar diaphragm 250 (FIG. 1). The diaphragms 248 and 250 are respectively supplied with pressurized air through conduits 252 and 254, which are connected to a T-fitting 255. Air under pressure is supplied to the fitting 255 through conduit 256 within the frame 2 and extending from the fitting 216; thus, upon opening of the control valve 218, all four of the diaphragms shown in FIG. 1 will be inflated, and all of the rolls will be simultaneously braked against movement to permit the easy removal of a motor vehicle therefrom.

The brake structure of the present invention requires little if any servicing once it is installed, and its initial installation requires a minimum amount of effort. The brake bands are all loosely held in the desired position, and there are no critical adjustments or tolerances. Moreover, the novel tubular diaphragm and actuator arrangement will compensate for considerable misalignment and wear in the brake system, and exert a very high braking force on the rolls. The brakes are also remotely actuated, and utilize readily available compressed air as a working fluid.

The brake retracting means prevent the linings of the brake bands from being subjected to unnecessary wear, and hence greatly prolong their life. Further, little or no relative movement occurs between the rolls and the brake bands during use of the brake device in effecting removal of a vehicle from the rolls, because of the great clamping pressure exerted by the diaphragm and actuator assembly. Accordingly, lining wear is kept to a minimum.

Obviously, many modifications and variations of the present invention are possible in the light of the above teachings. It is therefore to be understood that within the scope of the appended claims, the invention may be practiced otherwise than as specifically illustrated and described.

I claim:
1. In combination, a frame; a cylindrical roll mounted upon said frame for rotation about its longitudinal axis; and brake means for holding said cylindrical roll against rotation about its longitudinal axis, comprising: at least one brake band loosely supported at one end by said frame and extending circumferentially about a substantial portion of the outer surface of said roll; an inflatable diaphragm mounted upon said frame; and a floating actuator element disposed between said diaphragm and the other end of said brake band arranged to move said other end generally tangentially of and toward said roll upon inflation of said diaphragm.

2. The combination as defined in claim 1, including means normally urging said actuator in a direction away from said other end of said brake band and toward said diaphragm.

3. The combination as defined in claim 2, including means normally urging said brake band in a direction away from said roll.

4. The combination as defined in claim 1, wherein the frame includes a guide plate supported in spaced relation to said roll and presenting a beveled surface thereto, and wherein said one end of said brake band has an arcuate, transversely extending anchor element secured to the exterior surface thereof, said anchor element being engaged with said beveled surface, whereby to support said one end of said brake band, said beveled surface and said arcuate anchor element cooperating when said actuator moves said other end of said brake band, to urge said band into engagement with said roll.

5. In combination, a frame; a cylindrical roll mounted upon said frame for rotation about its longitudinal axis; and brake means for holding said roll against rotation comprising, a plurality of generally arcuate brake bands, each loosely supported at one end thereof by said frame and disposed to extend circumferentially about a substantial portion of the under, outer surface of said roll, a floating actuator element engaged with the other ends of both of said brake bands and arranged to be moved to simultaneously urge said other ends of said brake bands in a direction generally tangentially of and toward said roll, and means engaged with said floating actuator element operable to move said actuator element toward said other end of said brake bands to thereby engage said bands with said roll.

6. The combination defined in claim 5, wherein the means engaged with the floating actuator element is fluid pressure operable.

7. The combination defined in claim 6, wherein the fluid pressure operable means is an elongated tubular diaphragm having a plug in each end thereof, and wherein one of said plugs has a passage for admitting pressure fluid into and exhausting pressure fluid from said tubular diaphragm.

8. In combination, a frame; a cylindrical roll mounted upon said frame for rotation about its longitudinal axis; and brake means for holding said roll against rotation comprising, a plurality of generally arcuate brake bands, each supported at one end thereof by said frame and disposed to extend circumferentially about a substantial portion of the outer circumference of said roll, an actuator element engaged with the other end of said brake bands and arranged to be moved to simultaneously urge said other end of said brake bands in a direction generally tangentially of and toward said roll, and means operable by fluid pressure engaged with said actuator element and operable to move said actuator element toward said other end of said brake bands, said fluid pressure operable means comprising an elongated tubular diaphragm having a plug in each end thereof, one of said plugs having a passage for admitting pressure fluid into and exhausting pressure fluid from said tubular diaphragm, and a channel-shaped support member, said diaphragm being disposed in said channel-shaped support member, said actuator element having a plate disposed along one edge thereof engaged with said tubular diaphragm.

9. In combination, a frame; a cylindrical roll mounted upon said frame for rotation about its longitudinal axis; and brake means for holding said roll against rotation comprising, a plurality of generally arcuate brake bands, each supported at one end thereof by said frame and disposed to extend circumferentially about a substantial portion of the outer circumference of said roll, a floating actuator element engaged with the other end of said brake bands and arranged to be moved to simultaneously urge said other end of said brake bands in a direction generally tangentially of and toward said roll, means operable by fluid pressure engaged with said floating actuator element and operable to move said actuator element toward said other end of said brake bands, said fluid pressure operable means including an elongated tubular diaphragm having a plug in each end thereof, one of said plugs having a passage for admitting pressure fluid into and exhausting pressure fluid from said tubular diaphragm, means normally urging said actuator toward said diaphragm, and means normally urging said brake bands out of engagement with the outer surface of said roll.

10. A brake apparatus for simultaneously holding against rotational movement a pair of parallel cylindrical rolls mounted upon a frame for rotation about their longitudinal axis comprising: a pair of generally arcuate brake bands arranged in a common plane transverse to said rolls with one end of one band confronting one end of the other band, said confronting brake band ends being supported by said frame, each of said brake bands extending circumferentially about a substantial portion of a different one of said rolls, a pair of inflatable diaphragms, one positioned to confront the other end of each of said brake bands, a pair of actuator elements, each actuator element being positioned to extend between one of said diaphragms and one of said other brake band ends and both of said actuator elements being arranged to move their associated brake band ends generally tangentially of and toward their respective rolls, and means interconnecting the confronting portions of said brake bands for urging both out of engagement with their respective rolls.

11. A brake apparatus as defined in claim 10, including means interconnecting said actuator elements and said frame urging said actuator elements in a direction away from said other brake band ends.

12. A brake apparatus for simultaneously holding against rotational movement a pair of parallel rolls mounted upon a frame for rotation about their longitudinal axes, comprising: a first plurality of generally arcuate brake bands, a second, like plurality of generally arcuate brake bands, said first and said second plurality of brake bands being arranged in pairs extending transversely of said rolls with one end of one brake band of each pair confronting one end of the other brake band of said pair, said confronting brake band ends being supported by said frame, said first and said second plurality of brake bands each extending circumferentially about a substantial portion of one of said rolls, a pair of elongated inflatable diaphragms mounted upon said frame, one diaphragm being positioned to confront the other ends of each plurality of brake bands, a pair of actuator elements, one actuator element extending between each diaphragm and its associated brake band ends and being arranged to simultaneously move said ends substantially tangentially of and toward their respective rolls, and means interconnecting the confronting surfaces of each pair of brake bands urging said brake bands out of engagement with their respective rolls.

13. A brake apparatus as defined in claim 12, including means for simultaneously admitting air under pressure into the inflatable diaphragms.

14. A brake apparatus as defined in claim 12, including means interconnecting said actuator elements and said frame urging said actuator elements in a direction toward their respective diaphragms.

15. A brake apparatus as defined in claim 12, wherein said frame includes a plurality of guide plates, one extending between each pair of brake bands, said guide plates being supported in spaced relationship to and presenting a beveled end surface to each roll, and wherein each supported end of said first and said second plurality of brake bands has an arcuate, transversely extending anchor element thereon, each said supported brake band end being disposed between its respective roll and the beveled end of its associated guide plate with said arcuate anchor resting on said beveled end.

16. A chassis dynamometer, comprising: elongated frame means; two pairs of rolls rotatably mounted upon said frame means; a pair of brake bands extending around a substantial portion of the undersurface of each of said rolls; means carried by one end of each pair of brake bands engaged with said frame means for loosely supporting said brake bands on said frame means; floating actuator means engaged with the other end of each of said pairs of brake bands; and means for simultaneously moving the floating actuator means associated with each pair of brake bands in a manner to engage said brake bands with said rolls.

17. In combination, a frame; a cylindrical roll mounted upon said frame for rotation about its longitudinal axis; said frame including a guide plate supported thereon in spaced relation to said roll, and presenting a beveled surface to said roll; and brake means for holding said roll against rotation about its longitudinal axis, comprising: at least one brake band loosely supported at one end by said frame and extending circumferentially about a substantial portion of the outer circumference of said roll, said one end of said brake band having an arcuate, transversely extending anchor element secured to the exterior surface thereof, said anchor element being engaged with said beveled surface on said guide plate, whereby to support said one end of said brake band; and means engaged with the other end of said brake band and operable to move said other end tangentially of said roll, said beveled surface and said arcuate anchor element cooperating when said other end of said brake band is tangentially moved by said means to urge said band into engagement with said roll.

18. The combination as defined in claim 17, including means normally urging said brake band in a direction away from said roll.

19. The combination as defined in claim 17, wherein said means operable to move said other end of said brake band includes: an inflatable diaphragm mounted upon said frame, and disposed to confront said other end of said brake band; and a floating actuator element disposed to rest upon said diaphragm and extending into engagement with said other end of said brake band.

20. The combination as defined in claim 19, including means normally urging said floating actuator element in a direction away from said other end of said brake band and toward said diaphragm.

21. The combination as defined in claim 19, wherein said diaphragm is disposed in a channel-shaped support member arranged to open toward said other brake band end.

References Cited by the Examiner

UNITED STATES PATENTS

| | | | |
|---|---|---|---|
| 976,705 | 11/10 | Spellman | 188—77 X |
| 1,685,709 | 9/28 | Lee | 188—152.7 |
| 1,701,505 | 2/29 | Perrot | 188—77 X |
| 1,932,685 | 10/33 | Black | 188—152.7 |
| 2,619,201 | 11/52 | Crookston | 188—152.7 |
| 2,868,470 | 1/59 | Selsted | 188—77 X |
| 3,020,753 | 2/62 | Maxwell | 73—117 |
| 3,092,345 | 6/63 | Clayton et al. | 188—77 X |

FOREIGN PATENTS

| | | |
|---|---|---|
| 1,262,208 | 4/61 | France. |

ARTHUR L. LA POINT, *Primary Examiner.*